United States Patent [19]
Molland

[11] Patent Number: 5,284,665
[45] Date of Patent: Feb. 8, 1994

[54] COTTON CANDY DEVICE

[76] Inventor: Todd L. Molland, 8607 Westwood Center Dr. (Double Feature), Vienna, Va. 22182

[21] Appl. No.: 916,950

[22] Filed: Jul. 20, 1992

[51] Int. Cl.⁵ .............................................. A23G 3/00
[52] U.S. Cl. ...................................... 426/87; 29/451; 29/453; 206/459.5; 220/306; 426/104; 426/110; 426/134; 426/515; 426/660
[58] Field of Search .................. 426/87, 104, 110, 134, 426/383, 515, 660; 29/451, 453; 206/459.5; 220/306; 273/153 R, 156, 157 R; 446/97, 98, 99, 100, 101, 132

[56] References Cited
U.S. PATENT DOCUMENTS

| | | | |
|---|---|---|---|
| 3,459,296 | 8/1969 | Berg | 206/229 |
| 3,821,425 | 6/1974 | Russell | 426/110 |
| 4,902,519 | 2/1990 | Ream et al. | 426/91 |

FOREIGN PATENT DOCUMENTS 1106160  7/1955  France ............................. 426/134
2084846  9/1981  United Kingdom .

Primary Examiner—Leo B. Tentoni
Attorney, Agent, or Firm—M. Paul Hendrickson

[57] ABSTRACT

The present invention provides a cotton candy product wrapped about cotton candy stick and held by a unique cotton candy holding device. The device includes a bowl-shaped receptacle equipped with a brim that defines an open end of the receptacle, a supportive lid fitted with a stick engaging socket on one side of the lid and a receptacle engaging rim section on an opposite lid side. The device is used by wrapping cotton candy around the stick and securing the stick onto the stick engaging socket and then affixing the brim of the receptacle onto the rim section of the lid. If desired, a plastic wrap may then be used as overwrap for the cotton candy product.

13 Claims, 2 Drawing Sheets

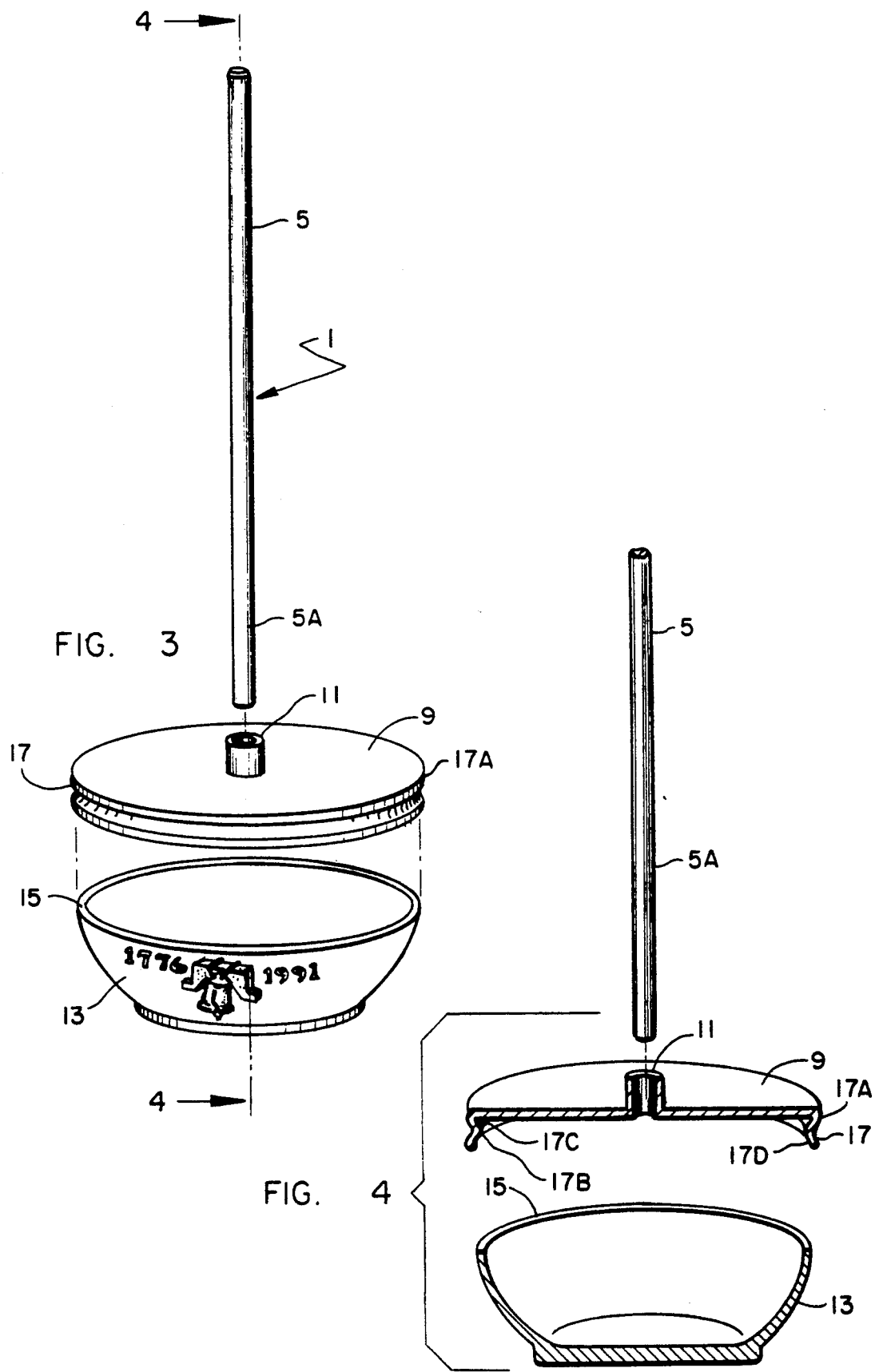

COTTON CANDY DEVICE

FIELD OF THE INVENTION

The present invention relates to an article for edible food and more particularly to a cotton candy article and its use.

BACKGROUND OF THE INVENTION

Cotton candy is a popular food product at festive occasions such as fairs, carnivals, sporting events, amusement parks, etc. The manufacture and sale of cotton candy has remained unchanged for years. The manufacture generally comprises wrapping threadlike fibers of melted sugar spun into a fluffy mass about an elongated cotton candy "stick" or holder which often is in the form of a paper cone. The fluffy mass of cotton candy is generally wrapped around one end of the stick as a bulbous mass leaving the other stick end free to hand-hold the stick. Currently it is common practice to wrap the cotton candy with a protective wrapping such as plastic wrap.

The manner in which the product is presented to the consuming public affords little, if any, memorabilia of an important or eventful occasion. After the cotton candy is consumed, the inedible components are typically discarded. The candy product commercial value is limited to what the consumer is willing to pay for the edible product. The cotton candy product generally requires the consumer to hand-hold the product until it is consumed. The product is essentially free from any flat surfaces upon which to rest the product. Thus, a consumer cannot safely lay the product upon a supporting object without risking its contamination or damage.

The cotton candy product also requires the constant attention of the vendor, purchaser or consumer when transported or manually held. The product is susceptible to damage and to damaging other persons or objects Impacting the product against another object or person can damage the product as well as the impacted object or person. From a vendor's viewpoint, the cotton candy product is bulky and generally requires substantial storage space once it is made. Since space is almost always at a premium in concession stands, very little advance stock piling of the product can occur. Therefore, the product cannot be effectively stocked. Similarly, the vendor must transport a bulky product and make frequent trips to a concession stand to replenish his stock. The current cotton candy products fail to overcome the aforementioned deficiencies.

SUMMARY OF THE INVENTION

The present invention provides a unique cotton candy product and device for holding cotton candy which, in turn, affords greater versatility to cotton candy vendors than the current cotton candy products and holding devices. The device of this invention comprises a decorative receptacle and lid which may be attached to a cotton candy "stick." The receptacle is preferably of a bowl-shaped form with a brim forming an open-bowl end. The lid may be suitably provided on one lid side with an annular rim or channel. The annular rim or channel is preferably positioned about an outer peripheral margin of the lid. The channel or rim is preferably of a flexible construction so that it biasingly receives the brim. The rim or channel therefore will mate onto and permit its firm securance onto the brim of the bowl by "snapping" the bowl onto the lid. The other side of the lid may be suitably provided with a means for securing the lid onto the cotton candy stick. The lid may be secured to the stick by a projecting socket sized to receivingly engage and mate onto the candy stick.

Unlike conventional cotton candy products, the cotton candy article of this invention protects the product against damage and contamination. The receptacle and lid form a substantially rigid and safe covering which affords several advantages over the prior art devices. The protective cap can be effectively utilized as a supportive base which stabilizes the product against movement and protects the product against collapsing or attrition. Consequently the user or vendor may place the product when equipped with a flat-based bowl in an inverted position (e.g. stick pointing upward) upon a flat surface. The capped product may also be stacked by placing the first row upon the receptacle bottom (i.e. stick pointing upward) and the next row with stick downward and bowl upward in a staggered manner. The third row may then be stacked with cap down and the next row with cap up with the sequence being alternatively repeated. This permits stacking or stockpiling of the cotton candy product within a more compact surface area than the conventional practice. The lid with the attached receptacle protects the product as well as other objects or persons against injury or damage. The product is more appealing and attractive to the consumer. The receptacle may embody a commemorative design and thus serve as memorabilia for a particular occasion or event. The article may also be sold at a higher profit margin than possible under current cotton candy packaging.

BRIEF DESCRIPTION OF THE DRAWINGS

FIG. 3 is an elevational view of unassembled cotton candy holding components of the device shown in FIG. 1.

FIG. 4 is a view taken along line 4—4 of FIG. 3.

DETAILED DESCRIPTION OF THE INVENTION

Figure 1:
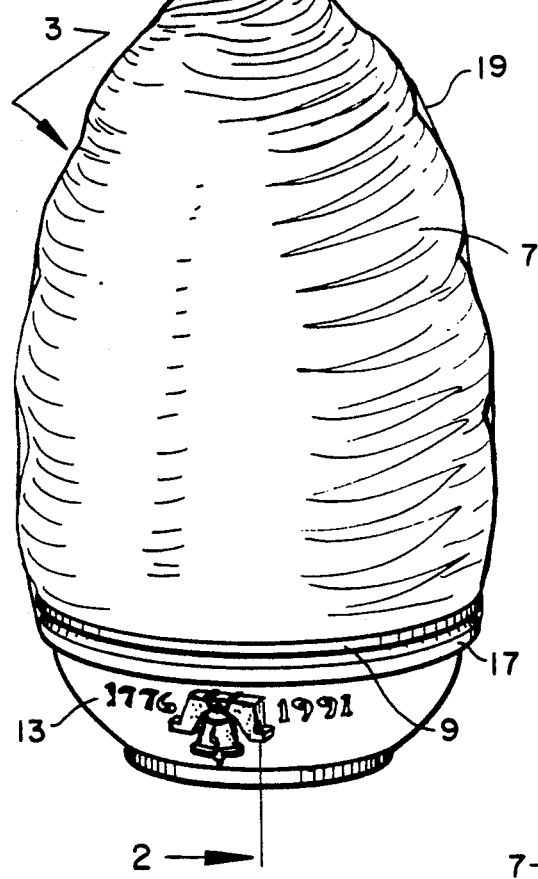
FIG. 1 is a perspective view of a cotton candy product which embodies the cotton candy device of this invention.

The cotton candy device of this invention may be more fully appreciated by referring to the accompanying drawings. The cotton candy device (generally referred to as 1 as shown in FIG. 3) is combined and cooperatively used to provide a cotton candy product (generally referred to as 3) as shown in FIG. 1. The depicted candy product 3 includes a stick (generally prefixed as 5), the bulbous-shaped filamentous cotton candy mass 7 wrapped about one end portion of stick 5A, a lid 9 anchored onto stick 5 by means of socket 11, a bowl-shaped receptacle 13 having a brim 15 which biasingly engages onto an annular rim section (generally prefixed as 17) of lid 9 and a wrap 19 (e.g. clear or decorative plastic film wrapping) wrapped about candy mass 7.

Figure 2:
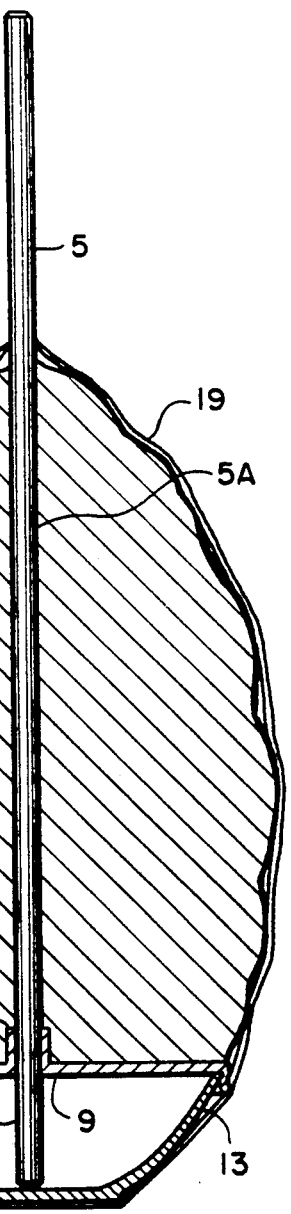
FIG. 2 is a cross-section view taken along line 2—2 of FIG. 1.

The lid 9 serves an important function of interconnecting and anchoring receptacle 13 onto stick 5. The lid 9 depicted in the Figures includes mean for affixing the elongated stick 5 onto lid 9. The particular affixing means are shown in the form an upwardly projecting, open-faced tubular socket 11 extending outwardly from one side of lid 9. The internal dimensions of socket 11 are sized to firmly receive and engage onto stick 5 and thereby upon slideable engagement to anchor stick 5 onto lid 9. In the preferred embodiment of the invention as shown in FIGS. 2 and 4, socket 9 forms a passage through lid 9 so that one end of stick 5 rests against the bottom internal surface of receptacle 13. This particular arrangement supports and maintains stick 5 in a more upright and vertical position.

Lid 9 also includes retaining means (generally designated as 17) for securing the decorative receptacle 13 onto lid 9. As may be observed from FIGS. 2-4, the depicted bowl-shaped receptacle 13 includes a brim 15 which defines an opening (shown, but not enumerated) of receptacle 13. The preferred retaining means as shown in FIG. 4 includes a peripheral rim section 17A positioned on an opposite side of lid 9 from socket 11 which interfacially engages onto brim 15. Rim 17 is preferably constructed of a plastic material which possesses sufficient resiliency to expand sufficiently to biasingly receive and retain brim 15 therewithin. The depicted rim 17 of FIG. 4 includes an internally disposed annular ridge 17B which serves to securely seat and retain brim 15 within seating groove 17C and an annular flange 17D which serves to initially guide the brim 15 onto ridge 17B and its seating onto channel 17C. Thus, by placing brim 15 in vertical alignment with annular channel section 17C, flange 17D initially guides brim 15 onto ridge 17B and by further biasing and forcing brim 15 over ridge 17B onto channel section 17C, bowl 13 then becomes securely engaged onto lid 9 which in turn is firmly secured onto stick 5 via socket 11. Rim 17 may include, if desired, an annular groove 17C of a slightly greater internal radius than the outermost portion of brim 15 and an annular ridge 17B of a lesser radius which in conjunction with the interfacing surfaces of lid 9 provides a seat for brim 15 to interlock thereto. If desired, lid 9 may include an annular channel (not shown) upon which brim 15 interlocks and seats onto or any other suitable means for securing the brim 15 onto lid 9.

Different shaped receptacles (e.g. cups, saucers, etc.) and lids (e.g. spoked-wheel configuration, oval, polygonal, etc.) may be applied to this invention. Similarly, other means or securing the stick 5 and the receptacle 13 onto the lid 9 may be applied to the invention. The type and composition of the materials from which the bowl 13 and lid 9 are constructed may be altered as desired. Rigid materials such as thermosets, plastic, thermoplastic, rubber, glass and the like may be used to construct the solid components of this invention. Thermoplastic materials such as polyolefins (e.g. polyethylene, polypropylene, etc.), polyovinylhalides (e.g. polyvinylchlorides), polyamides (e.g. NYLON), polyesters (e.g. DACRON, RAYON, etc.). polystyrenes and other similar materials which typically possess sufficient memory and flex characteristics represent the preferred and safest materials for constructing lid 9 and receptacle 13 herein.

What is claimed is:

1. In a cotton candy product wherein the product includes a filamentous cotton candy mass wrapped about an elongated stick, the improvement of which comprises a device for retainingly holding said cotton candy mass onto the device, said device comprising:
   A) a receptacle which includes a brim defining an open end of the receptacle, and
   B) a supportive base equipped with:
      a. means for affixing the elongated stick onto the supportive base, and
      b. retaining means for securing the receptacle onto the supportive base.

2. The product according to claim 1 wherein the receptacle comprises a bowl-shaped receptacle.

3. The product according to claim 1 wherein the means for affixing the elongated stick onto the supportive base of the device comprises a projecting socket sized to slideably receive and retain the stick therewithin.

4. The product according to claim 1 wherein the receptacle comprises a decorative thermoplastic bowl and the supportive base comprises a lid equipped on one lid side with a rimmed portion of sufficient size to receive and biasingly retain the brim of said receptacle therewithin and a socket on an opposite lid side for retainingly affixing the elongated stick thereto.

5. A cotton candy holding device adapted to be secured onto an elongated stick upon which a cotton candy mass is wrapped, said device comprising:
   A) a decorative receptacle of a bowl-shaped configuration, and
   B) a supportive lid equipped with means for affixing the stick onto the lid and means for supportively securing the decorative receptacle in an inverted position upon said lid.

6. The device according to claim 5 wherein the receptacle includes a brim defining an open end of the receptacle and the lid includes a rimmed portion which may be biased onto said brim and thereby supportively secure the decorative receptacle onto said lid.

7. The device according to claim 6 wherein the means for affixing the stick onto the lid comprises a socket projecting outwardly from the lid.

8. The device according to claim 7 wherein the rimmed portion and the socket are disposed upon opposite sides of the lid.

9. The device according to claim 8 wherein rimmed portion includes an annular groove for biasingly seating the brim onto the lid.

10. The device according to claim 9 wherein the rimmed portion includes an annular ridge positioned between said groove and an annular flange projecting outwardly from said ridge for guiding the brim onto said groove.

11. A method of making a cotton candy product comprising:
   A) providing a supportive base equipped with a stick engaging member on one side of the base and a receptacle engaging member on an opposite side of the base,
   B) wrapping a mass of cotton candy filaments about one end of an elongated stick,
   C) engaging the one end of the elongated stick onto the stick engaging member, and
   C) securing a decorative receptacle equipped with engaging means onto the receptacle engaging member of said base.

12. The method according to claim 11 wherein the supportive base used in said method comprises a lid equipped with a socket on one side of the lid for engaging onto the stick and the stick is engaged onto said lid.

13. The method according to claim 12 wherein the lid used in said method includes a flexible rimmed portion having an annular groove for seating a brim of the receptacle therewithin and an annular ridge in juxtaposition to said brim for retainingly holding said brim within said annular groove.

* * * * *